(12) United States Patent
Scharnbacher

(10) Patent No.: US 10,275,462 B2
(45) Date of Patent: Apr. 30, 2019

(54) AUTOMATIC TRANSLATION OF STRING COLLECTIONS

(71) Applicant: SAP SE, Walldorf (DE)

(72) Inventor: Jens Scharnbacher, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/706,790

(22) Filed: Sep. 18, 2017

(65) Prior Publication Data

US 2019/0087415 A1     Mar. 21, 2019

(51) Int. Cl.
*G06F 17/00*     (2019.01)
*G06F 17/28*     (2006.01)
*G06F 9/54*      (2006.01)

(52) U.S. Cl.
CPC ............ *G06F 17/289* (2013.01); *G06F 9/547* (2013.01); *G06F 17/2809* (2013.01)

(58) Field of Classification Search
CPC ............... G06F 17/275; G06F 17/2735; G06F 17/2836; G06F 17/27; G06F 17/2854; G06F 17/2872; G06F 17/21; G06F 17/2827; G06F 17/3043
See application file for complete search history.

(56) References Cited

U.S. PATENT DOCUMENTS

| | | | | |
|---|---|---|---|---|
| 5,535,120 A | * | 7/1996 | Chong ................ | G06F 17/2264 704/3 |
| 5,587,902 A | * | 12/1996 | Kugimiya ............. | G06F 17/218 704/2 |
| 5,608,622 A | * | 3/1997 | Church ................... | G06F 17/28 704/3 |
| 5,708,829 A | * | 1/1998 | Kadashevich ...... | G06F 17/2795 704/10 |
| 6,389,387 B1 | * | 5/2002 | Poznanski ............. | G06F 16/374 704/9 |
| 6,493,713 B1 | * | 12/2002 | Kanno ................ | G06F 17/2735 |
| 6,996,520 B2 | * | 2/2006 | Levin .................. | G06F 17/2735 704/10 |
| 7,366,653 B2 | | 4/2008 | Kilgore et al. | |

(Continued)

OTHER PUBLICATIONS

"String Package Translation"; Copyright 2017 OnTheGoSystems,Inc.; retrieved on-line Sep. 15, 2017; 5 pages; (https://wpml.org/documentation/support/string-package-translation/).

*Primary Examiner* — Edgar X Guerra-Erazo
(74) *Attorney, Agent, or Firm* — Fish & Richardson P.C.

(57) ABSTRACT

A request to translate an input collection of collocated separate strings from a source language to a target language is received. The input collection is associated with a combination of meanings for the collocated separate strings within a context of the input collection. A search for the collocated separate strings is performed in a database storing a number of collection units of separate strings in the source language and a correspondingly translated number of collection units of translated separate strings in the target language. An output collection unit of separate strings in the target language is determined as a translated collection of separate strings of the input collection based on evaluating the input collection as a unit and evaluating the number of collection units of separate strings in the source language and the correspondingly translated number of collection units of translated separate strings in the target language at the database.

18 Claims, 7 Drawing Sheets

(56) References Cited

U.S. PATENT DOCUMENTS

| | | | |
|---|---|---|---|
| 7,593,844 B1* | 9/2009 | Takeshita | G06F 17/2836 704/2 |
| 7,720,856 B2 | 5/2010 | Goedecke et al. | |
| 7,765,098 B2* | 7/2010 | Bradford | G06F 17/2809 704/2 |
| 8,145,472 B2* | 3/2012 | Shore | G06F 17/289 704/2 |
| 8,548,791 B2* | 10/2013 | Itagaki | G06F 17/2818 704/2 |
| 8,612,203 B2* | 12/2013 | Foster | G06F 17/2827 704/2 |
| 9,189,475 B2* | 11/2015 | Shri | G06F 17/2872 |
| 9,201,869 B2* | 12/2015 | Ogren | G06F 17/2282 |
| 9,423,920 B2 | 8/2016 | Brunswig et al. | |
| 9,558,182 B1* | 1/2017 | Chenon | G06F 17/2827 |
| 9,703,774 B1* | 7/2017 | Chenon | G06F 17/2827 |
| 2002/0111789 A1* | 8/2002 | Hull | G06F 17/2795 704/4 |
| 2005/0102130 A1* | 5/2005 | Quirk | G06F 17/28 704/4 |
| 2006/0004560 A1* | 1/2006 | Whitelock | G06F 17/2827 704/2 |
| 2009/0055358 A1* | 2/2009 | Tomasic | G06F 19/22 |
| 2010/0082324 A1* | 4/2010 | Itagaki | G06F 17/2836 704/2 |
| 2010/0161639 A1* | 6/2010 | Bobrow | G06F 17/2775 707/759 |
| 2011/0184722 A1* | 7/2011 | Sneddon | G06F 17/289 704/7 |
| 2015/0120273 A1* | 4/2015 | Gusakov | G06F 17/289 704/2 |
| 2015/0286632 A1* | 10/2015 | Meunier | G06F 17/2854 704/2 |
| 2015/0378990 A1* | 12/2015 | Martinez Corria | G06F 17/289 704/2 |
| 2016/0085749 A1 | 3/2016 | Bartley et al. | |
| 2016/0124944 A1* | 5/2016 | Andreoli | G06F 17/2854 704/2 |
| 2016/0162473 A1* | 6/2016 | Cogley | G06F 17/28 704/9 |
| 2016/0170974 A1* | 6/2016 | Martinez Corria | G06F 17/289 704/4 |
| 2016/0350108 A1 | 12/2016 | Joo | |

* cited by examiner

AUTOMATIC TRANSLATION OF STRING COLLECTIONS

BACKGROUND

Automatic translation is related to storing previously translated paragraphs, sentences, sentence fragments, or phrases and reusing translations when needed. Language search engines typically search in one or more translation memories for the translations based on input strings submitted for translation. Once the input strings are matched with corresponding translations, the corresponding translations are returned in the form of output strings.

However, searching for short strings often yields multiple alternative translation results, because a single word may have multiple meanings in a source language and the multiple meanings may have multiple translations in a target language. For example, considering English as the source language and German as the target language, the string "to" has at least three meanings in English, namely expressing direction to a person or a place, expressing a point of limit in time, and expressing an aim or an intention. The different meanings have different translations in German, namely, "an", "bis", and "nach". Hence, it is challenging to translate single-word strings automatically and accurately without additional information such as translation context.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Figure 1:
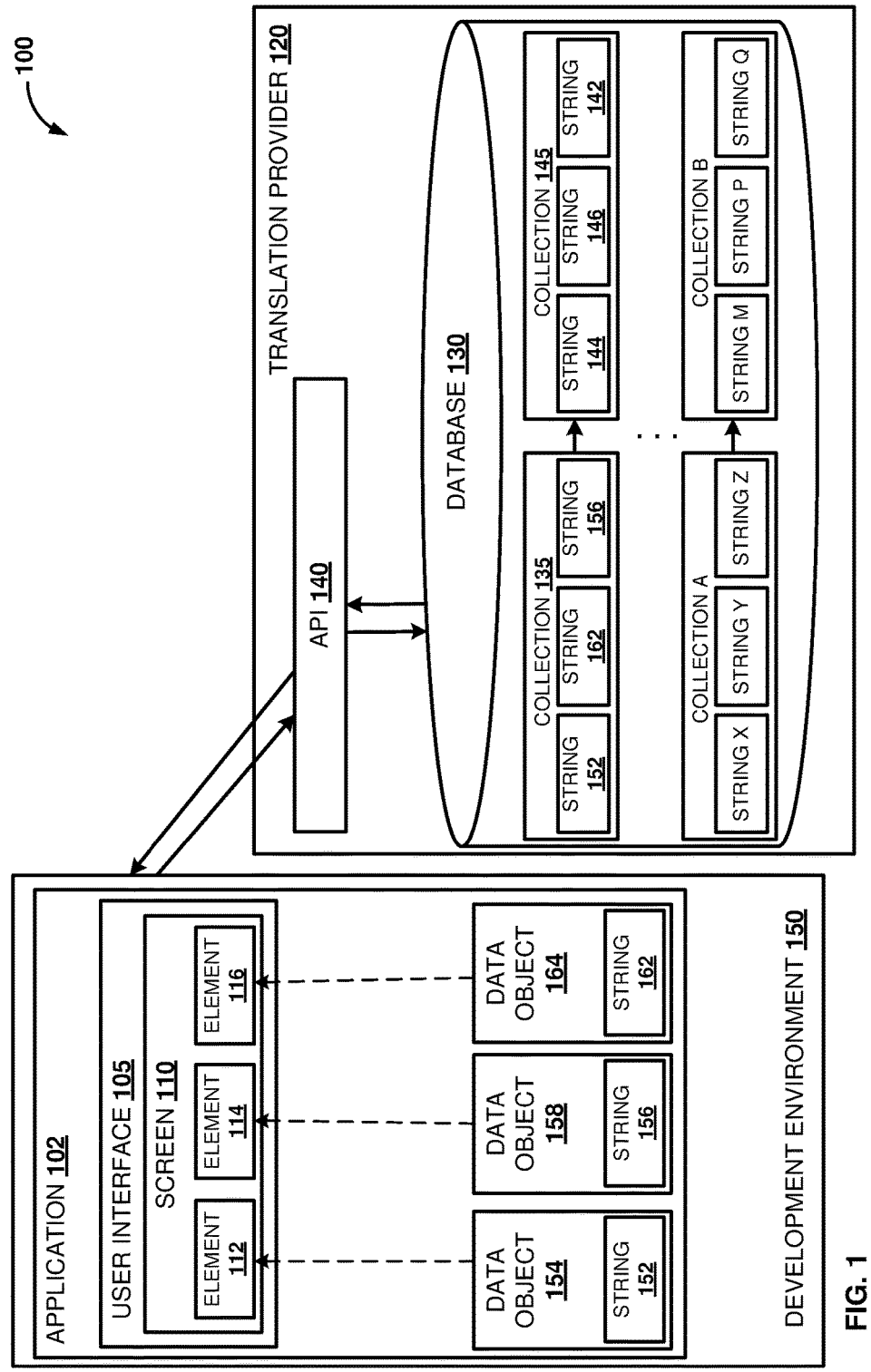
FIG. 1 is a block diagram illustrating a system to translate a collection of collocated strings, according to one embodiment.

Embodiments of techniques for automatic translation of string collections are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

A string collection is a group of multiple separate character sequences (strings) related in context. A string may be a word or a phrase. Context is defined as one or more parts (strings or a set of strings) of the collection that precede or follow one or more strings of the collection. Context helps to identify an appropriate meaning of the strings within the collection and to reduce ambiguities in understanding and translating the strings.

By collocating preceding and/or following strings together in groups of distinct strings to form string collections, meaning of each string of the group is defined based on other strings in the group, thus providing context information of the group of strings. Context information of the group of strings identifies a combination of meanings of the strings. The combination of meanings is specific for the group of strings. For example, English language string "type" may mean "a category" or "to typewrite". However, when combined with one or more other strings in a group, meaning of the string "type" may be determined based on the other strings in the group. For example, if the group includes strings ["this"; "type"; "of"], it may be determined that "type" means "a category" because of the combination of the strings "this" and "of". Moreover, meanings of strings "this" and "of" may also be determined in the context of the strings in the group, thus creating a combination of meanings of the strings in the group that is specific for the group of strings. In another example, the group may include strings ["type"; "version"], and it may be determined that "type" also means "a category" because of the context of the group collection. In yet another example, the group may include strings ["type"; "a message"], and it may be determined that "type" means "to typewrite". However, when strings in the group are ordered differently (e.g., ["a message"; "type"]), it may be determined that "type" means "a category". Thus, order of the strings in the group may also affect the context of the group collection.

The string collection may include a collocated number of single, distinct strings collected as separate character sequences having no semantic relation. For example, the single strings may be collected from a UI screen of a software application. In one embodiment, strings in the group may be collected in a random order. Alternatively, the string collection may include an ordered collection of single strings (e.g., a vector of strings). When single strings are collected from the UI screen, the single strings may be included in the string collection following an order corresponding to a preview order of those strings on the UI screen. For example, when the UI screen includes three buttons positioned in a vertical sequence and with a left alignment, strings associated with labels of the left-aligned buttons may be collected in a descending order, starting from a top button (of the three buttons) to a bottom button or vice versa. When the buttons are in the vertical sequence, but are not aligned, collection of strings may start from a button closer to a left border of the screen and strings may be collected in order from left to right.

Submitting collocated string collections for an automatic translation as separate units provides context information related to the meaning of strings in the collections and, thus, improves accuracy of the automatic translation. For example, English language string "to" may be associated with a number of strings in German (e.g., "an", "bis", "nach") as translation options. The translation options, however, have different meanings in the target language. Automatically translating the single string "to" without context information would return one of the strings "an", "bis", or "nach", selected randomly. Thus, when the string "to" is originally part of an email form, the automatic translation of the string "to" into "bis" or "nach" may not be accurate.

However, when the string "to" is submitted for a translation in a collection unit together with one or more other separate strings, translation accuracy is improved. For example, submitting the string "to" in an input collection unit to be translated together with strings "send" and "subject" would return a corresponding collection of strings ["senden", "an", "thema"] as an output collection unit. The collection of strings ["senden", "an", "thema"] includes a combination of translated meanings of meanings of strings ["send", "to", "subject"] that is specific for this collection of strings. The translation of the string "to" into "an" is more accurate in the context of email forms, compared to translations of the string "to" into "bis" or "nach". Thus, when considered together as a group, strings of the input collection ["send", "to", "subject"] provide a translation context for each other and accuracy of the automatic translation is improved.

FIG. 1 is a block diagram illustrating a system 100 to translate a collection of strings, according to one embodiment. The system 100 includes environment 150. In one embodiment, the environment 150 may be a development environment that provides a set of processes and programming tools to an application developer (not illustrated) that develops application programs such as application 102. Examples of development environment include, but are not limited to, Microsoft Visual Studio®, Eclipse®, and NetBeans IDE®. In various embodiments, the environment 150 may be a build or test environment where the developed applications are built and either automated or manual tests are executed to exercise new or changed program code of the applications. The environment 150 may be a virtualized environment that allows serial or parallel testing of the applications including quality assurance (QA) testing. The environment 150 may mirror a production environment and may connect to production services and data such as databases. The environment 150 may include one or more environments that combine development, building, and testing of the developed applications within the environment 150.

The application 102 may be described as an application program designed to perform a function for users or for other application programs. For example, the application 102 may be a word processor program, a database program, a Web browser, a development tool, a drawing program, a paint program, an image editing program, a communication program, etc.

In one embodiment, the application 102 includes a user interface (UI) 105. Users of the application 102 may interact with the application 102 through the UI 105. The UI 105 may display one or more UI screens such as screen 110. The screen 110 may include various UI elements. Examples of such UI elements include, but are not limited to, input controls (e.g., checkboxes, radio buttons, list boxes, toggles, date fields, input fields, labels, buttons, dropdown menus, text boxes), navigational components (e.g., search fields, paginations, breadcrumbs, sliders, tags, icons), informational components (e.g., tooltips, progress bars, notifications, message boxes, modal windows), and containers (e.g., accordions). The UI elements that are part of the screen 110 have text labels that include one or more strings. For example, when a UI element is a button, a text label on the button may be one or more words such as "Send" or "Page Setup". The UI elements presented on the screen 110 on the UI 105 may be logically connected. For example, the screen 110 may be a UI form including one or more UI elements with text labels. Examples of UI forms include email forms, login forms, booking forms, registration forms, online payment forms, and so on.

The screen 110 includes elements 112, 114, and 116. The elements of the screen 110 may be described by source code encapsulated in one or more files or artifacts associated with the application 102. The one or more files/artifacts may include translatable text strings. Examples of such files with translatable text strings include, but are not limited to, Java® properties files, Microsoft®.NET Framework resource (".resx") files, and Apple® iOS Extensible Markup Language Localization Interchange File Format (XLIFF) (".xlf") files. In one embodiment, the elements of the screen 110 are based on corresponding controls or data objects included in the application 102. A data object corresponding to an element is associated with a portion of source code that defines properties of the element. For example, the data object may be associated with a defined size, a position, a color, a function, a text label, etc. for rendering information at the element. In one embodiment, the elements 112, 114, and 116 are displayed on the screen 110 based on data objects 154, 158 and 164 and defined properties, respectively. The data objects 154, 158, and 164 are associated with the defined properties for display at the elements 112, 114, and 116, including text labels that are displayed. The data objects 154, 158, and 164 include text strings 152, 156, and 162, respectively. The text strings 152, 156, and 162 correspond to the text labels of the elements 112, 114, and 116 to be presented on the UI 105. For example, when the screen 110 is an email form, the text labels of the elements 112, 114, and 116 may have values "from", "to", and "subject" based on the text strings 152, 156, and 162 that store the text strings "from", "to", and "subject".

In one embodiment, the environment 150 is connected to a translation provider 120. During the development or testing of the application 102, collections of strings may be sent for translation from a source language to a target language to the translation provider 120. In one embodiment, UI screens of the developed application 102 may include text information provided in a human language. Elements displayed on UI screens have labels that may be provided in different languages, such as English, German, French, etc. The source language may be a selected initial language when building the application 102. The UI elements of the UI 105, associated with the corresponding data objects, include the text strings presented on the UI 105 in the source language. For example, when the UI 105 of the application 102 is originally designed and developed to present the UI elements in English language, the data objects 154, 158, and 164 are defined to include the text strings 152, 156, and 162 in English language words. Such text strings may be label text presented on the UI 105.

In one embodiment, during design and development of the application 102, the defined strings, such as the strings 152, 156, and 162 are to be translated and have corresponding strings in the multiple languages targeted for the application 102. However, translation of the strings as single entities, whether they include one word, a phrase or a sentence, may provide a number of translation options into a target language. The provided translation options in the target language may correspond to different meanings of the strings in the source language. Determining a correct option of the number of translation options is error-prone. Without additional information related to the translated strings and the context of their appearance, the automatic translation may yield inaccurate translations of the strings.

Therefore, a request for the translation that includes a collection of separate strings 152, 156, and 162 may be sent to the translation provider 120, either manually by a human translator or automatically. The request for translation may be sent through the environment 150 or via other program utilized for the development, building, or testing of the application 102. The translation may be triggered upon creation of the source code describing the application 102. For example, the development of the application 102 may include phases of coding, testing, creating documentation, and translation. The text strings included in controls or data objects created during the coding phase may be later translated as part of one or more of the development phases. Alternatively, when the application 102 is developed and prepared to be shipped as a single language application, the request for the translation of the collection of separate strings may be sent by the application 102 during runtime of the application 102, e.g., when a screen that includes the collection of separate strings is displayed in the target language (e.g., German language).

When the application 102 is developed to support displaying of screens in multiple human languages, the text strings 152, 156, and 162 are translated in one or more languages (e.g., target languages) that are different from the source language. The translations may be stored as part of the application 102 and bundled with the one or more artifacts (including the data objects 154, 158, and 164) pertinent to the application 102. The bundled artifacts may be prepared to be provided for consumption into a productive environment. The bundles of the application 102 including the translations may be shipped as an installable package to customers, or may be provisioned in a cloud environment and provided as Software as a Service (SaaS). For example, the bundled artifacts may be installed at the productive environment including required hardware and software resources. In another example, the bundles may be provisioned at a cloud platform and the application 102 may be consumed as a service.

In one embodiment, the application 102 is configured to send the one or more string collections to an application programming interface (API) 140 of the translation provider 120. The API 140 is designed to translate collections of distinct strings together as collection units. Through the API 140, the translation provider 120 receives input collections of strings for translation. The translation provider 120 is configured to consider each string collection unit as a group of separate strings to be translated together. A request for translation of a collection of separate strings as a collection unit may include, as parameters, at least the collection of separate strings and source and target languages for the translation. For example, when strings of the collection are part of an email form to be translated, the translation request may be similar to "translate(collection=["From"; "To"; "Subject"]), sourcelang="English", targetlang="German". In various embodiments, the translation provider 120 may receive collections of strings that include a number of strings included in a UI form, as well as partial collections of strings that include at least two of the number of strings included in the UI form. Strings in the partial collections of strings may be collected from the UI form based on one or more collection criteria. For example, the one or more collection criteria may include alignment of the UI strings in the UI form (e.g., collect the labels of the elements with left-alignment, collect the labels of vertically aligned elements), type of the UI elements including the corresponding text labels (e.g., collect the labels of input fields, text boxes, buttons, etc.), other classification of the UI elements, e.g., input required/input optional, and so on.

In one embodiment, the translation provider 120 references a database 130 for storing collections of strings in a source language (e.g., English language). The database 130 may be part of the translation provider 120. Alternatively, the database 130 may be external to the translation provider 120. The database 130 may also be a shared database accessed by a number of translation provider instances such as the translation provider 120. A stored collection of strings includes a number of text strings that are logically correlated, for example, based on a UI context. A collection of a number of strings in the source language is associated with a corresponding collection of a corresponding number of strings in the target language in the database 130. The collections of strings in the target language represent translations of the collections of strings from the source language into the target language. Thus, the database 130 stores corresponding pairs of collections of strings in a source language associated with collections of strings in a target language. It should be appreciated that the database 130 may store translations of multiple collections of strings from a source language to a number of target languages.

In one embodiment, the database 130 stores string collection 135. The collection 135 includes text string 152, text string 162, and text string 156. The collection 135 is associated with string collection 145. The collection 135 includes a number of text strings in a source language (e.g., English) grouped together for translation from the source language to a target language (e.g., German). Respectively, the collection 145 includes a corresponding number of text strings in the target language. The text strings included in the collection 145 represent translations of the text strings of the collection 135 in the target language. For example, text strings 144, 146, and 142 represent translations of text strings 152, 162, and 156.

In one embodiment, the API 140 receives a request to translate an input collection of text strings and transfers the request to the database 130 of the translation provider 120. The input collection of text strings is to be translated from a source language to a target language. The input collection of text strings includes collocated text strings 152, 156, and 162. The translation provider 120 evaluates the input collection of text strings and compares the input collection of text strings to the collections of text strings in the source language that are stored in the database 130. The translation provider 120 compares strings of the input collection of strings with the strings included in the collections of strings in the source language that are stored in the database 130. Additionally, the translation provider 120 compares a cardinality of strings in the input collection with the cardinal numbers of strings in the collections of text strings. By comparing strings of the collections and cardinalities of the strings, the translation provider 120 determines one or more collections of strings in the database 130 that include strings matching the input strings, and, also, include the same number of strings as the input collection of strings. Since the input collection of text strings for translation includes three strings—text string 152, text string 156, and text string 162, and the collection 135 includes three strings—text string 152, text string 162, and text string 156, the translation provider 120 identifies the collection 135 as a collection of text strings that exactly matches the input collection of text strings.

In one embodiment, the collection 135 is associated with the collection 145 in the database 130. Text strings included in the collection 145 represent translations of the text strings of the collection 135 in a target language. A single string in a source language may be translated as a number of strings in a target language and vice versa. Similarly, a collection of a number of strings in the source language may be translated as a phrase consisting of a different number of strings in the target language. For example, a group of two strings ["iron"; "out"] in English may be translated as a group of four strings "[durch"; "diskussion"; "zu"; "löisen"] in German. Therefore, to avoid unintended translations of the collections of separate strings as phrases or expressions that combine the collected strings, the database 130 is designed to store records associating collections of strings in the source language that include same cardinal number of strings as corresponding collections of strings in the target language. Based on the association between the collection 135 and the collection 145 in the database 130, the translation provider 120 sends the collection 145 to the environment 150. For example, the collection 145 may be transferred from the database 130 to the API 140 and the API 140 of the translation provider 120 may send the collection 145 to the environment 150 as an output collection of strings.

Figure 2:
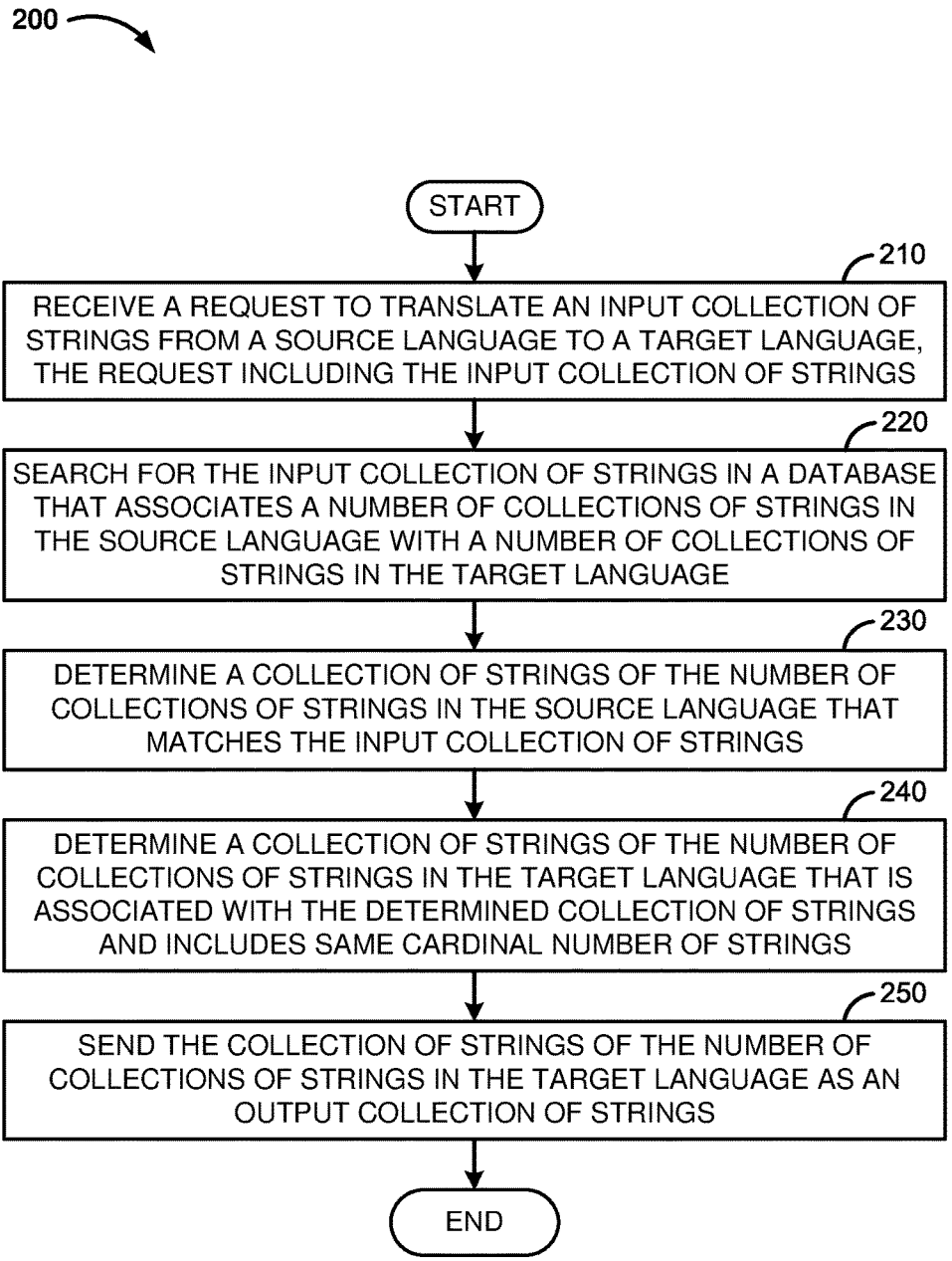
FIG. 2 is a flow diagram illustrating a process to translate a collection of collocated strings, according to one embodiment.

FIG. 2 illustrates a process 200 to translate an input collection of strings from a source language to a target language, according to one embodiment. At 210, a request to translate the input collection of strings is received. The request includes the input collection of strings, the source language and the target language for the translation. For example, the request includes the input collection of strings ["from", "to", "subject"], source language "English" and target language "German". At 220, a search for a collection of strings that matches the input collection of strings is performed among a number of collections of strings in the source language. For example, the translation provider 120, FIG. 1, may evaluate collections of strings in the source language mapped to collections of strings having the same cardinal number of strings in the target language in a database of the translation provider. At 230, a collection of strings of the number of collections of strings in the source language is determined at the database. The collection of strings in the source language matches the input collection of strings. The determined collection of strings includes same number of strings as the input collection of strings. Further, the determined collection of strings includes the strings of the input collection of strings. The determined collection of strings may be with the same order of strings within the collection as an order of strings at the input collection of strings.

In one embodiment, a collection of strings in the target language represents a combination of separate meanings of the strings in the source language corresponding to a same combination of meanings of correspondingly translated strings into the target language. At 240, a collection of strings in the target language, that is associated with the collection of strings in the source language and includes same cardinal number of strings as the collection of strings in the source language, is determined based on the determined collection of strings in the source language. In one embodiment, strings included in the collection of strings in the target language represent translations of the strings of the determined collection of strings from the source language to the target language. The database associates collections of strings in the source language with corresponding collections of strings in the target language that have the same cardinal number of strings. At 250, the determined collection of strings in the target language is sent as an output collection of strings. For example, the translation provider 120, FIG. 1, may send the determined collection of strings 145 to the application 102 as the output collection of strings.

Figure 3:
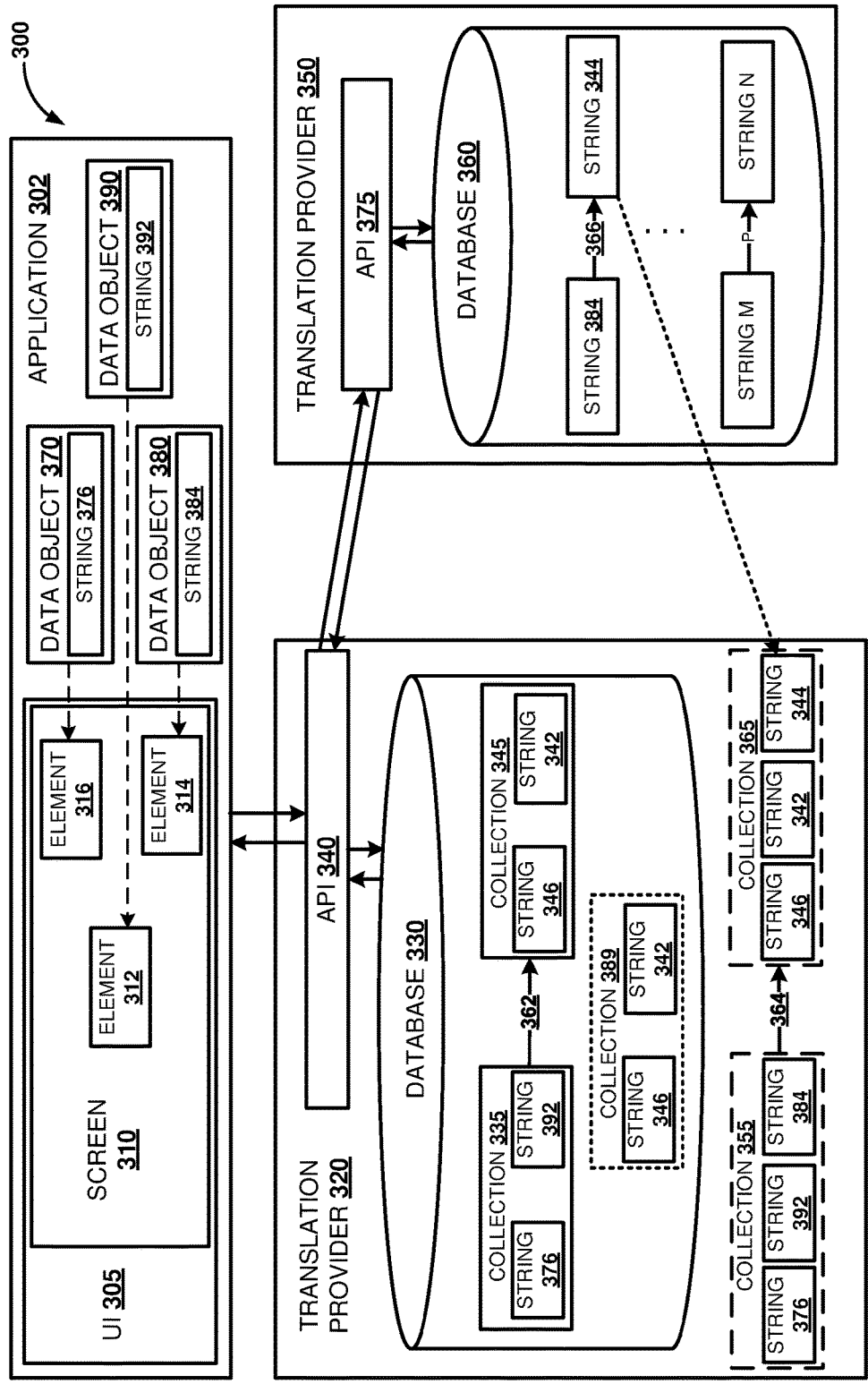
FIG. 3 is a block diagram illustrating a system to translate a collection of strings when a translation of the collection of strings is not available, according to one embodiment.

FIG. 3 illustrates a system 300 to translate an input collection of strings from a source language to a target language when a matching collection of strings is not identified, according to one embodiment. System 300 includes application 302. The application 302 is similar to application 102 described above with reference to FIG. 1. The application 302 includes UI 305. Users of the application 302 may interact with the application 302 via the UI 305. The UI 305 may display one or more UI screens such as screen 310. The screen 310 may be a UI form such as an email form, a login form, a booking form, a registration form, an online payment form, etc. The screen 310 may include various UI elements. The UI elements may include element 312, element 314, and element 316.

In one embodiment, the elements of the screen 310 are based on corresponding data objects 370, 380, and 390 of the application 302. The data objects 370, 380, and 390 corresponding to the elements 316, 314, and 312, respectively, include portions of source code that define properties of the elements such as a size, a position, a color, a function, a text label, etc. of the elements. The elements 312, 314, and 316 are displayed on the screen 310 based on the data objects 390, 380, and 370, respectively. The data objects 390, 380, and 370 include text strings 392, 384, and 376, respectively. The text strings 392, 384, and 376 define values of the text labels of the elements 312, 314, and 316.

In various embodiments, collections of strings may be sent to the translation provider 320 for translation from a source language to a target language. When the application 302 is developed, built, or tested (e.g., at an environment such as the environment 150 of FIG. 1) to support displaying of screens in multiple languages, the text strings 392, 384, and 376 are to be translated in one or more languages (e.g., target languages) during development of the application 302. This way, the translations can be bundled and prepared for shipping to production environment together with one or more artifacts pertinent to the application 302. The one or more artifacts may include the data objects 390, 380, and 370. A request for the translation that includes the collection of strings 392, 384, and 376 may be sent to the translation provider 320 manually by a translator person or automatically by the environment. The request for the translation of the collection of strings may be also sent by the application 302 during runtime when a screen with the string collection is to be displayed in the target language.

In one embodiment, the translation provider 320, like the translation provider 120 of FIG. 1, is configured to receive and translate collections of strings as collection units. The translation provider 320 includes database 330. The database 330 stores a number of collection units of strings in the source language (e.g., English) associated with a number of collection units of strings in the target language (e.g., German) The numbers of collections of strings in the source and target languages may include collections of strings with different cardinality per pair of matching collections in the source and target languages. The database 330 includes a collection of strings in the source language correspondingly mapped with a translated collection of strings in the target language. The mapped collections include same cardinal number of strings. For example, a collection of two strings in the source language is associated with a collection of two strings in the target language. Similarly, a collection of ten strings in the source language may be associated with a collection of ten strings in the target language.

In one embodiment, the translation provider 320 compares strings of the received input collections of strings with the number of collections of strings in the source language to determine one or more collections of strings of the number of collections of strings in the source language that correspond to at least two (e.g. a subset) strings from the input collection of strings. For example, the input collection of strings includes strings, A, B, C, and D. The number of collections of strings in the source language at the database may include two collections, where the first collection includes strings A and B, and the second collection includes strings C and D. Based on the comparison made by the translation provider 320, either one or both of the collections may be selected, as both of them correspond to subsets of the input collection.

Based on the comparison, the translation provider 320 may determine one or more collections of strings of the collections of strings in the source language that correspond to at least two strings of the input collection of strings. The translation provider 320 may select at least one collection of strings based on a pre-configured logic. For example, the translation provider 320 may be configured to select from the determined one or more collections of strings based on evaluating cardinalities of strings included in the determined collections. The translation provider 320 may select a collection of strings that is with closest cardinality corresponding to the input collection of strings. Table 1 includes an exemplary input collection of strings and a number of similar collections of strings in the source language:

TABLE 1

| Input String Collection | String Collections | | |
|---|---|---|---|
| ["a message", "of", "this", "type"] | ["type, "a message"] | ["type", "of", "a message"] | ["type", "to"] |

When the translation provider 320 compares strings of the input collection of strings ["a message", "of", "this", "type"] with the number of collections of strings in the source language (collections of strings ["type,"a message"], ["type", "of", "a message"], and ["type", "of"]), the translation provider 320 determines collections of strings ["type, "a message"], ["type", "of", "a message"] that correspond to at least two strings from the input collection of strings. A higher cardinality of matching strings may imply more meaningful context. Thus, of the determined collections of strings, the translation provider 320 selects collection of strings ["type", "of", "a message"] that is with closest cardinality corresponding to the input collection of strings.

In one embodiment, the translation provider 320 receives a request to translate an input collection of separate strings from the application 302. The request is received at API 340. The API 340 is designed for translation of string collections as collection units. The input collection of strings includes text strings 392, 384, and 376. For example, when the screen 310 displays an email form, the text strings 392, 384, and 376 may have values ["from"; "to"; "subject"], respectively. The strings included in the input collection of strings are collected from the screen 310. It should be appreciated, however, that the strings included in the input collection of strings may be collected from textual information of the corresponding data objects 390, 380, and 370 rather than from the text labels of the elements 312, 314, and 316 of the screen 310. The strings are grouped in a random order in the input collection of strings. The input collection of strings may also include an ordered collection of single strings such as a vector of strings.

In one embodiment, the request is transferred from the API 340 to the database 330. Upon comparison of the input collection of strings 392, 384, and 376 with the number of strings in the source language, the translation provider 320 selects collection 335 as a matching collection of strings. The translation provider 320 determines that collection 335 is a subset of at least two strings of the input collection of strings (strings 376 and 392) and does not include strings different from the input collection of strings. In addition, the translation provider 320 determines that, among a set of collections of strings that include strings of the input collection and do not include strings different from the input collection, the collection 335 includes a closest number of strings matching with strings of the input collection.

In one embodiment, the database 330 stores an association 362 between the collection 335 and collection 345. The collection 345 includes strings 346 and 342. The strings 346 and string 342 represent translations in the target language of a combination of meanings of the strings 376 and 392 that is specific for the collection 335.

In one embodiment, the translation provider 320 determines that string 384 is missing from the collection 335 that includes the string 376 and the string 392. Therefore, the translation provider 320 stores collection 389 as a temporary record in the database 330. The collection 389 is a copy of the collection 345 and includes the strings 346 and 342. In addition, the translation provider 320 provides a request for searching for the missing string 384 to a translation provider 350 that is associated with a database 360 storing a number of single strings in the source language and a corresponding number of single strings in the target language. The translation provider 320 requests the search because the missing string 384 is a single string and not a subset of at least two strings. The translation provider 320 may send the request through the API 340. Alternatively, the translation provider 320 may include the database 360 and direct the request for translation of the single string directly to the database 360, without calling an external translation provider, such as the translation provider 350.

In one embodiment, the translation provider 350 includes API 375 and the database 360. The translation provider 350 receives the one or more requests for translation through the API 375. The API 375 is a dedicated API for single string translation. The API 375 transfers the one or more requests to the database 360. The database 360 includes a number of strings in the source language (e.g., English) associated with a number of strings in the target language (e.g., German). It should be appreciated that the database 360 may store translations of multiple single strings from the source language into a number of target languages. The translation provider 350 receives the request to translate the string 384 from the source language to the target language. The translation provider 350 searches in the database 360 for one or more strings in the source language that match the string 384. In one embodiment, the database 360 includes an association 366 of the string 384 with string 344. The string 344 represents a translation of the string 384 into the target language. Therefore, based on the association 366 between the string 384 and the string 344, the translation provider 350 responds to the request by sending the string 344, e.g., through the API 375 to the API 340.

In one embodiment, the translation provider 320 receives the string 344 in response to the request to translate the string 384. The translation provider 320 combines the string 344 and the temporarily stored collection of strings 389 to create a collection of strings 365. The collection of strings 365 represents a translation of the input collection of strings in the target language. The translation provider 320 sends the collection 365 to the application 302 as an output collection of strings in response to receiving the request to translate the input collection of strings from the source language to the target language.

In one embodiment, a new record is stored in the database 330. The new record associates the input collection of strings in the source language (e.g., collection 355 that includes strings 376, 392, and 384) with the newly created collection 365 that includes strings 346, 342, and 344) of strings in the target language. For example, the new record may be stored as association 364 in the database 330. In such manner, the database 330 may be enhanced iteratively with new records corresponding to new translation pairs of collections of collocated strings.

In one embodiment, based on the comparison of the strings of the received input collection of strings with the number of collections of strings in the source language, the translation provider 320 determines a number of collections of strings in the source language that include at least two (e.g., a subset) strings of the input collection of strings and do not include strings different from the input collection.

Figure 4:
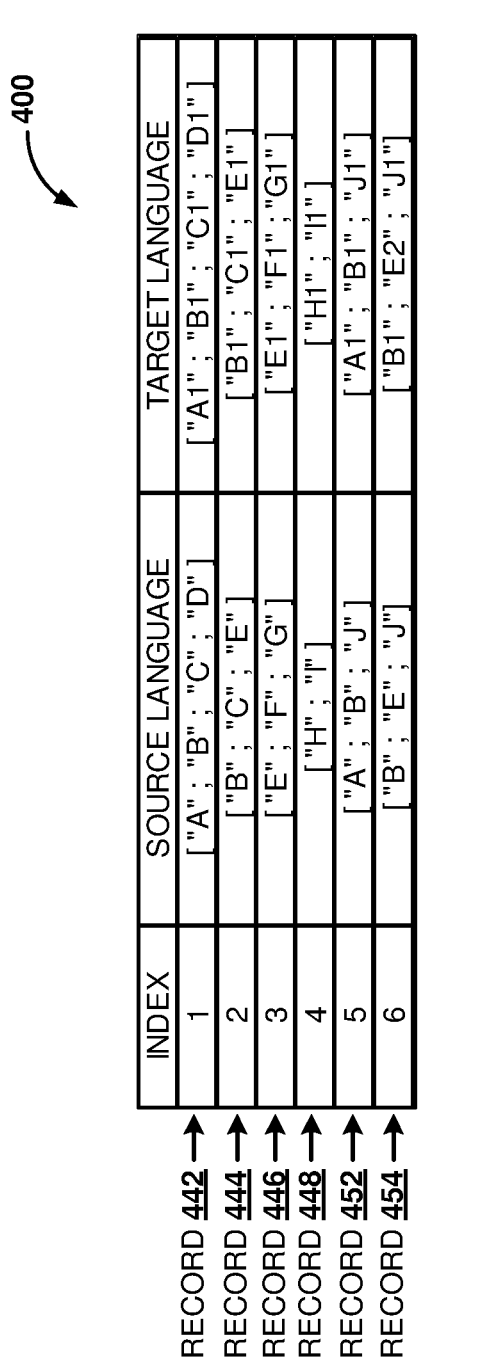
FIG. 4 is an exemplary database table that includes a number of collections of strings in the source language that include at least two strings of an input collection of strings, according to one embodiment.

FIG. 4 illustrates an exemplary database table 400 that includes a number of collections of strings in the source language that include at least two (e.g., a subset) strings of an input collection of strings and do not include strings different from the input collection of strings, according to one embodiment. In one embodiment, the input collection of strings may be such as ["A"; "B"; "C"; "D"; "E"; "F"; "G"; "H"; "I"; "J"]. Upon comparison of strings of the input collection of strings with stored number of collections of strings in the source language at the database table 400, a number of records in the database table 400 that include collections of strings may be determined. The number of records associate collections of at least two (e.g., a subset) strings of the input collection of strings with corresponding collections with corresponding number of strings in the target language. For example, the translation provider 320, FIG. 3, may determine records 442, 444, 446, 448, 452, and 454 of the table 400 as storing such associations between collections of strings in the source language and collections of strings in the target language. In one embodiment, record 442 stores an association of collection ["A"; "B"; "C"; "D"] to collection ["A1"; "B1"; "C1"; "D1"], record 444 stores an association of collection ["B"; "C"; "E"] to collection ["B1"; "C1"; "E1"], record 446 stores an association of collection ["E"; "F"; "G"] to collection ["E1"; "F1"; "G1"], record 448 stores an association of collection ["H"; "I"] to collection ["H1"; "I1"], record 452 stores an association of collection ["A"; "B"; "J"] to collection ["A1"; "B1"; "J1"], and record 454 stores an association of collection ["B"; "E"; "J"] to collection ["B1"; "E2"; "J1"]. In this case, the translation provider 320 may try to translate the input collection of strings as a combination of two or more collections of strings that include the strings ["A"; "B"; "C"; "D"; "E"; "F"; "G"; "H"; "I"; "J"] of the input collection of strings. The translation provider 320 may be configured with a specific logic for selecting collections of strings corresponding to sets of at least two strings from the input collection of strings. For example, the collections corresponding to sets of at least two strings may be selected based on a cardinality of strings, based on a first collection found, based on optimizations to determine largest number of subsets that are found at the database 330, or a combination of the above. Optimizations for the selection of determined collections of strings in the source language at the database 330 may be defined to facilitate the generations of an output to the translation request received at the API 340 of the translation provider 320.

The translation provider 320 may select records of the determined six records in the database table 400 that include non-overlapping groups of strings in the source language. For example, the translation provider 320 may select record 442, record 446, and record 448 out of the six records. The records 442, 446, and 448 include collection ["A"; "B"; "C"; "D"], collection ["E"; "F"; "G"], and collection ["H"; "I"], respectively. Consequentially, the translation provider 320 may determine collections of strings in the target language that are associated with the collections ["A"; "B"; "C"; "D"], ["E"; "F"; "G"], and ["H"; "I"] in the records 442, 446, and 448, as described above with reference to collection 335 and collection 345. The translation provider 320 may combine the determined collections of strings in the target language to create a collection of strings in the target language that includes translations of the collections ["A"; "B"; "C"; "D"], ["E"; "F"; "G"], and ["H"; "I"].

In one embodiment, the translation provider 320 may select records of the determined six records in the database table 400 that include overlapping groups of strings in the source language. For example, the translation provider 320 may select record 442, record 448, and record 454 out of the six records. The records 442, 448, and 454 include collection ["A"; "B"; "C"; "D"], collection ["H"; "I"], and collection ["B"; "E"; "J"], respectively. The translation provider 320 may determine collections of strings in the target language that are associated with the collections ["A"; "B"; "C"; "D"], ["H"; "I"], and ["B"; "E"; "J"] in the records 442, 448, and 454, as described above with reference to collection 335 and collection 345. The translation provider 320 may combine the determined collections of strings in the target language to create a collection of strings in the target language that includes translations of the collections ["A"; "B"; "C"; "D"], ["H"; "I"], and ["B"; "E"; "J"]. Further, the translation provider 320 may select a translation for string "E" out of the options "E1" and "E2" based on a number of occurrences of a certain translation in the six collections. For example, the translation provider 320 may determine that "E1" is more appropriate translation for string "E" because "E1" occurs in two collections of translated strings (collection ["B1"; "C1"; "E1"] and collection ["E1"; "F1"; "G1"]).

However, upon combining translations of several collections of strings, still a translation of one or more strings of the input collection of string in the source language may be determined to be missing in the combined collection of strings in the target language. For example, a translation of the string "J" (or alternatively, string "F") is missing in the combined collection of strings in the target language. In this case, the translation provider 320 may store temporarily the combined collection of strings in the target language in the database 330 (like storing temporarily the collection 389) and may request translation of the string "J" (or the string "F") as a single string from the translation provider 350. Upon receiving the translation of the string "J" (or the string "F") in the target language from the translation provider 350, the translation provider 320 may include the received translation in the target language in the combined collection of strings in the target language that is stored temporarily in the database 330, and create a complete collection of strings in the target language.

The complete collection of strings in the target language may represent a translation of the input collection of ten strings in the source language. The complete collection of strings in the target language may be outputted in response to the request to translate the input collection of ten strings in the source language. Also, as described above with reference to the association 364, the translation provider 320 may store, as a new record in the database 330, an association between the input collection of ten strings in the source language and the complete collection of strings in the target language.

Figure 5A:
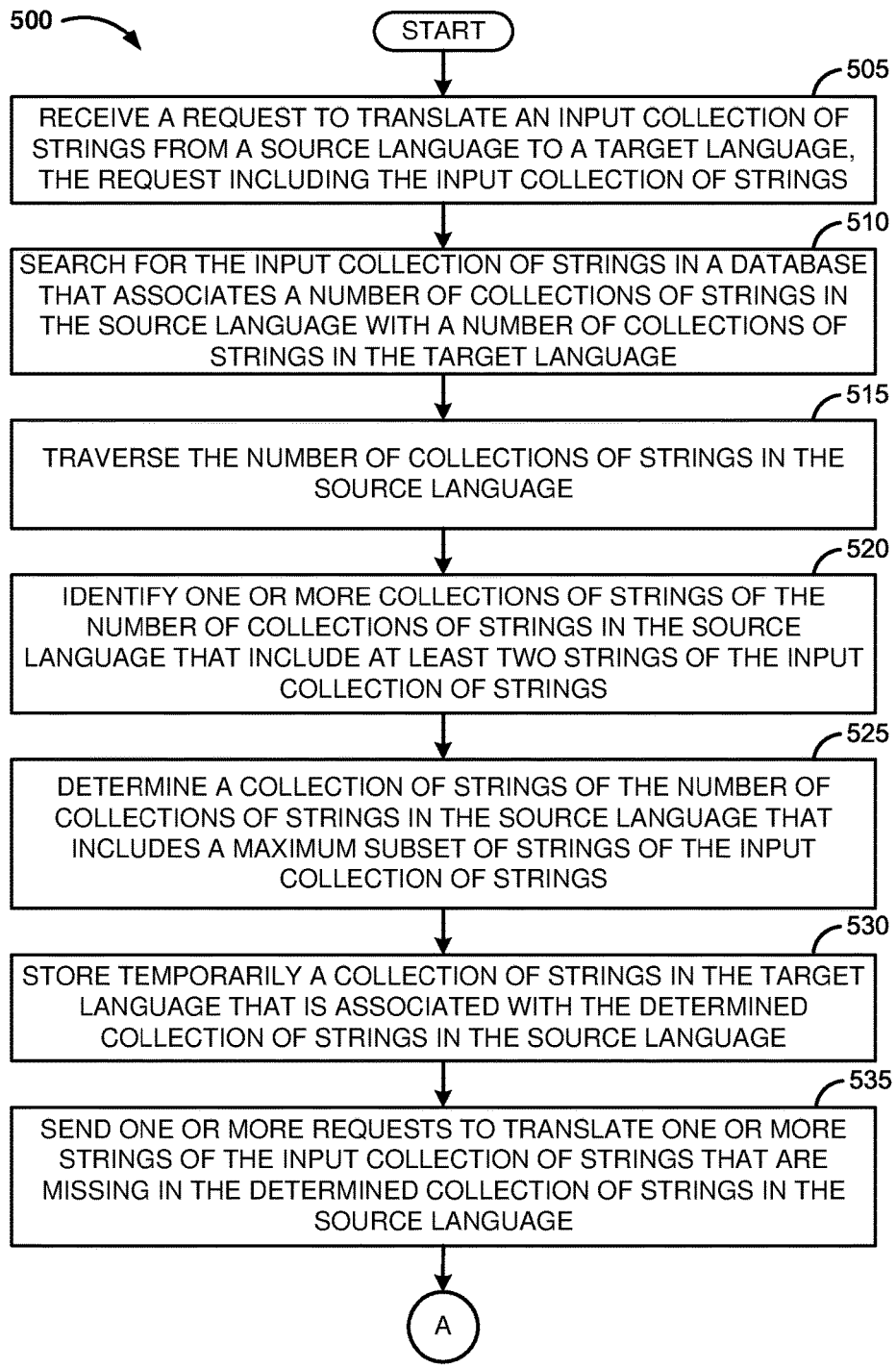
FIGS. 5A-5B are flow diagrams illustrating a process to translate a collection of strings when a translation of the collection of strings is not available, according to one embodiment.
Figure 5B:
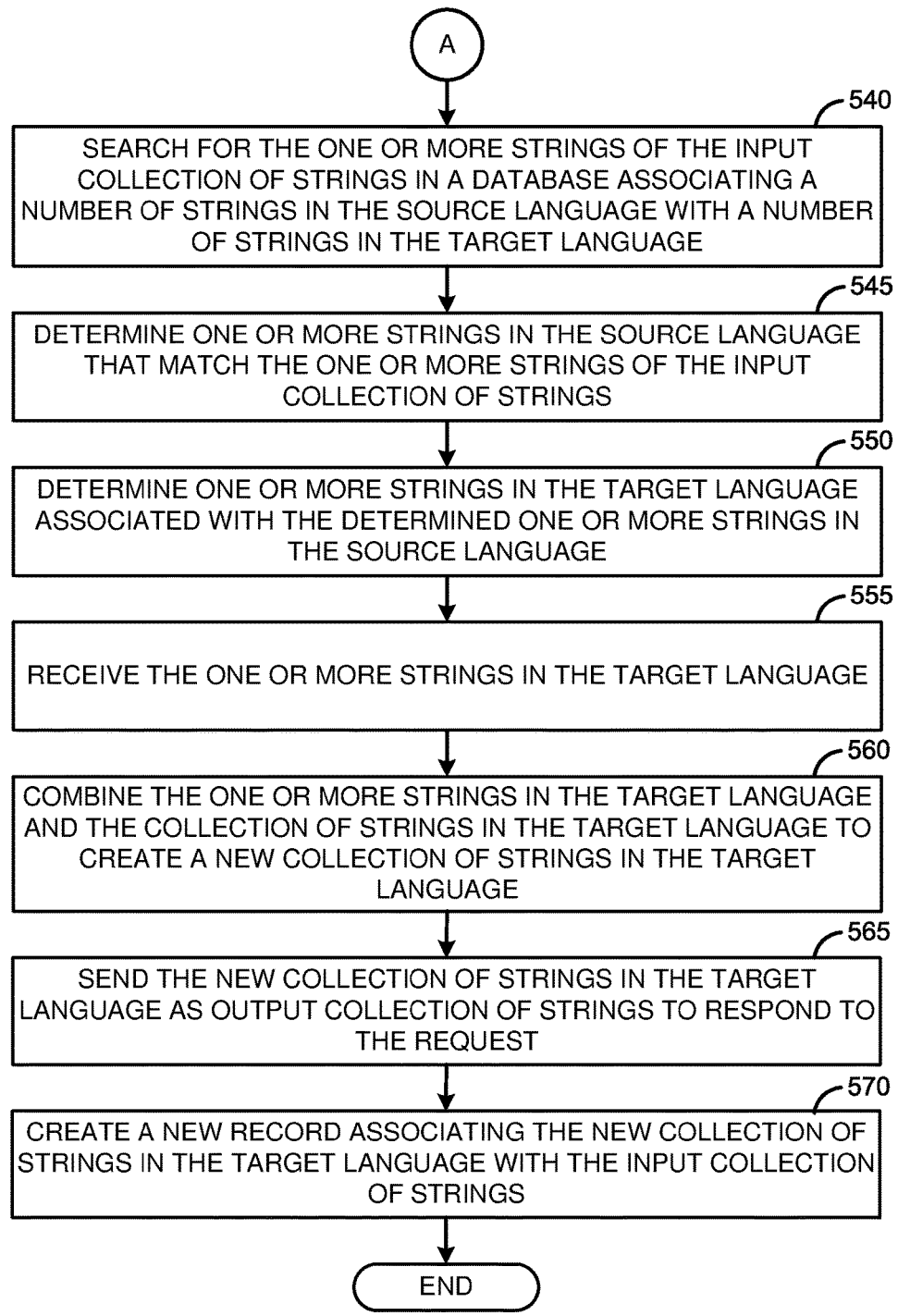

FIGS. 5A and 5B illustrate a process 500 to translate an input collection of strings from a source language to a target language when a matching collection of strings is not identified. At 505 (FIG. 5A), a request to translate an input collection of strings from a source language to a target language is received. The request includes the input collection of strings. For example, the request may be received at translation provider 320, FIG. 3, and may include an input collection of string 392, string 384, and string 376. At 510, a search for the input string collection is performed in a database. The database associates a number of collections of strings in the source language with a number of collections of strings in the target language. At 515, the number of collections of strings in the source language is traversed. At 520, one or more collections of strings of the number of collections of strings in the source language are identified. An identified collection of strings of the source language corresponds to a subset including at least two strings of the input collection of strings. At 525, a collection of strings is determined based on one or more selection criteria. It may be configured that a selected collection is one that includes a maximum number of strings (larger subset) of the input collection of strings between the identified one or more collections of strings in the source language. For example, the collection 335 of FIG. 3 includes string 376 and string 392. The string 376 and the string 392 represent a subset of the input collection of strings. At 530, a collection of strings in the target language is temporarily stored in the database. The collection of strings in the target language is associated with the determined collection of strings in the source language. At 535, one or more requests to translate one or more strings of the input collection of strings are sent. The one or more requests include the one or more strings of the input collection of strings that are missing in the determined collection of strings in the source language.

At 540 (FIG. 5B), a search for the one or more strings is performed in a database that associates a number of single strings in the source language with a number of single strings in the target language. For example, database 360 of FIG. 3 may be searched, string by string, for the one or more strings. At 545, one or more strings in the source language are determined. The determined one or more strings in the source language match the one or more missing strings from the input collection of strings. At 550, one or more strings in the target language are determined. The one or more strings in the target language are associated with the one or more strings in the source language. At 555, the one or more strings in the target language are received. At 560, the received one or more strings in the target language are combined with the temporarily stored collection of strings in the target language to create a new collection of strings in the target language. The new collection of strings in the target language represents a collocated translation of the input collection of strings from the source language to the target language. At 565, the new collection of strings in the target language is sent as an output collection of strings in response to the request. Further, at 570, a new record associating the new collection of strings in the target language with a collection of strings in the source language (e.g., the input collection of strings) is created and stored in the database.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
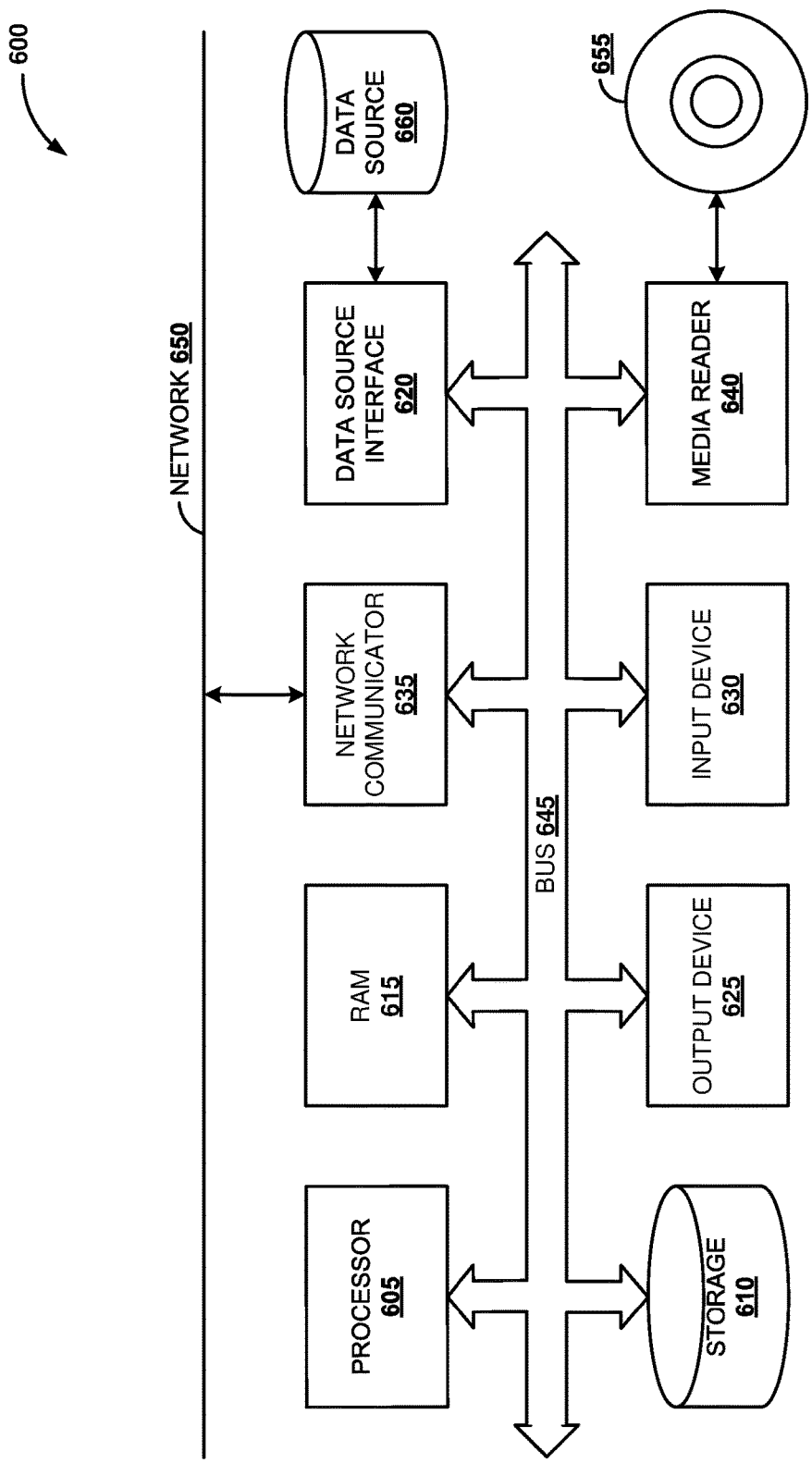
FIG. 6 is a block diagram of an exemplary computer system, according to one embodiment.

FIG. 6 is a block diagram of an exemplary computer system 600. The computer system 600 includes a processor 605 that executes software instructions or code stored on a computer readable storage medium 655 to perform the above-illustrated methods. The processor 605 can include a plurality of cores. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. According to some embodiments, such as some in-memory computing system embodiments, the RAM 615 can have sufficient storage capacity to store much of the data required for processing in the RAM 615 instead of in the storage 610. In some embodiments, all of the data required for processing may be stored in the RAM 615. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments, the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to automatically translate collections of strings, the method executed by at least one processor, the method comprising:

receiving, by the at least one processor, a request to translate an input collection of collocated separate strings from a source language to a target language, wherein the request is received at an application programming interface (API) for translation of collections of separate strings as units, wherein the API is associated with a first database, wherein the request comprises the input collection, the source language and the target language, and wherein the collocated separate strings are text strings collected from a user interface (UI) screen of an application;

evaluating, by the at least one processor, the input collection as a unit to determine translations of the collocated separate strings in a context of the input collection, wherein evaluating the input collection comprises:

performing, by the at least one processor, at least one search at the first database, wherein the first database maps a plurality of collection units of separate strings in the source language with a plurality of translated collection units of translated separate strings in the target language, and wherein a meaning of a string of a collection unit from the plurality of collection units in the source language is defined by a context of the collection unit in the source language, and the meaning of the string corresponds to a meaning of a corresponding string of a mapped collection unit from the plurality of translated collection units in the target language; and based on the evaluation, determining, by the at least one processor, an output collection unit of separate strings from the plurality of translated collection units in the target language as a translated collection of separate strings, wherein translated separate strings of the translated collection correspond to meanings of the collocated separate strings in the context of the input collection.

2. The method of claim 1, wherein a cardinality of the collection unit in the source language is equal to a cardinality of the mapped collection unit in the target language stored at the first database.

3. The method of claim 1, wherein the context of the collection unit in the source language is defined to correspond to a combination of strings part of the collection unit in the source language, wherein a combination of meanings of the strings of the collection unit in the source language corresponds to a same combination of meanings for the translated separate strings of the translated collection.

4. The method of claim 1, wherein performing the at least one search at the first database comprises:
determining that the collection unit in the source language at the first database matches with the input collection.

5. The method of claim 4, wherein performing the at least one search at the first database further comprises:
based at least partly on an exact match for the input collection being missing from the first database, traversing the plurality of collections units of separate strings in the source language at the first database to identify a collection unit in the source language that corresponds to a subset of at least two strings of the collocated separate strings; and
determining the collection unit in the source language and a corresponding collection unit in the target language.

6. The method of claim 5, further comprising:
storing temporarily, by the at least one processor, at the first database, the corresponding collection unit in the target language.

7. The method of claim 5, wherein evaluating the input collection through performing the at least one search comprises:
based at least partly on determining that a set of at least two strings is missing in the plurality of collection units of separate strings in the source language at the first database:
determining one or more strings from the collocated separate strings that are missing in the determined collection unit in the source language;
searching, string by string, for the one or more strings at a second database that stores a plurality of strings in the source language associated with a corresponding plurality of strings in the target language; and
determining one or more strings in the target language associated with the one or more strings in the source language at the second database.

8. The method of claim 7, wherein searching, string by string, at the second database further comprises:
sending a request to translate a string from the one or more strings from the source language to the target language at a dedicated API for single string translation associated with the second database; and
receiving the string in the target language through the API.

9. The method of claim 8, further comprising:
combining, by the at least one processor, the one or more strings in the target language and the corresponding collection unit in the target language to determine the output collection unit of separate strings as the translated collection of separate strings.

10. The method of claim 9, further comprising:
creating, by the at least one processor, at the first database, a record that associates the input collection in the source language with the output collection unit of separate strings in the target language.

11. A computer system to automatically translate collections of strings, the system comprising:
a processor; and
memory communicatively coupled to the processor, the memory storing instructions which, when executed by the processor, cause the processor to perform operations comprising:
receiving a request to translate an input collection of collocated separate strings from a source language to a target language, wherein the request is received at an application programming interface (API) for translation of collections of separate strings as units, wherein the API is associated with a first database, wherein the request comprises the input collection, the source language and the target language, and wherein the collocated separate strings are text strings collected from a user interface (UI) screen of an application;
evaluating the input collection as a unit to determine translations of the collocated separate strings in a context of the input collection, wherein evaluating the input collection comprises:
performing at least one search at the first database, wherein the first database maps a plurality of collection units of separate strings in the source language with a plurality of translated collection units of translated separate strings in the target language, and
wherein a meaning of a string of a collection unit from the plurality of collection units in the source language is defined by a context of the collection unit in the source language, and the meaning of the string corresponds to a meaning of a corresponding string of a mapped collection unit from the plurality of translated collection units in the target language; and
based on the evaluation, determining an output collection unit of separate strings from the plurality of translated collection units in the target language as a translated collection of separate strings, wherein translated separate strings of the translated collection correspond to meanings of the collocated separate strings in the context of the input collection.

12. The system of claim 11, wherein a cardinality of the collection unit in the source language is equal to a cardinality of the mapped collection unit in the target language stored at the first database.

13. The system of claim 11, wherein the context of the collection unit in the source language is defined to correspond to a combination of strings part of the collection unit in the source language, wherein a combination of meanings of the strings of the collection unit in the source language corresponds to a same combination of meanings for the translated separate strings of the translated collection.

14. The system of claim 11, wherein performing the at least one search at the first database further comprises:
based at least partly on an exact match for the input collection being missing from the first database, traversing the plurality of collections units of separate strings in the source language at the first database to identify a collection unit in the source language that corresponds to a subset of at least two strings of the collocated separate strings;
determining at least one collection unit of at least two strings in the plurality of collection units of separate strings in the source language at the first database;
determining at least one collection unit of translated strings in the target language, the at least one collection unit of translated strings in the target language corresponding to the at least one collection unit of the at least two strings;
storing temporarily, at the first database, the at least one collection unit of translated strings in the target language;
determining one or more strings from the collocated separate strings that are missing in the determined at least one collection unit of the at least two strings;
searching, string by string, for the one or more strings at a second database that stores a plurality of strings in the source language associated with a corresponding plurality of strings in the target language; and determining one or more strings in the target language associated with the one or more strings in the source language at the second database.

15. The system of claim 14, wherein searching, string by string, at the second database further comprises:

sending a request to translate a string from the one or more strings from the source language to the target language at a dedicated API for single string translation associated with the second database; and receiving the string in the target language through the API.

16. The system of claim 15, the operations further comprising:

combining the one or more strings in the target language and the at least one collection unit of translated strings in the target language to determine the output collection unit of separate strings as the translated collection of separate strings.

17. The system of claim 16, the operations further comprising:

creating, at the first database, a record that associates the input collection in the source language with the output collection unit of separate strings in the target language.

18. A non-transitory computer readable medium storing instructions which when executed cause a computer system to perform operations comprising:

receive a request to translate an input collection of collocated separate strings from a source language to a target language, wherein the request is received at an application programming interface (API) for translation of collections of separate strings as units, wherein the API is associated with a first database, wherein the request comprises the input collection, the source language and the target language, and wherein the collocated separate strings are text strings collected from a user interface (UI) screen of an application;

evaluate the input collection as a unit to determine translations of the collocated separate strings in a context of the input collection, wherein evaluating the input collection comprises:

perform at least one search at the first database, wherein the first database maps a plurality of collection units of separate strings in the source language with a plurality of translated collection units of translated separate strings in the target language, and wherein a meaning of a string of a collection unit from the plurality of collection units in the source language is defined by a context of the collection unit in the source language, and the meaning of the string corresponds to a meaning of a corresponding string of a mapped collection unit from the plurality of translated collection units in the target language; and based on the evaluation, determine an output collection unit of separate strings from the plurality of translated collection units in the target language as a translated collection of separate strings, wherein translated separate strings of the translated collection correspond to meanings of the collocated separate strings in the context of the input collection.

* * * * *